United States Patent [19]

Ishizuka et al.

[11] Patent Number: 5,313,635
[45] Date of Patent: May 17, 1994

[54] COMPILING SYSTEM FOR DISTRUBUTED COMPUTER SYSTEM WITH MULTIPLE TYPES OF COMPUTERS

[75] Inventors: Akiko Ishizuka; Takahide Ohkami, both of Kanagawa, Japan

[73] Assignee: Mitsubishi Denki Kabushiki Kaisha, Tokyo, Japan

[21] Appl. No.: 951,461

[22] Filed: Sep. 25, 1992

[30] Foreign Application Priority Data

Sep. 26, 1991 [JP] Japan .................. 3-274602

[51] Int. Cl.$^5$ .............................. G06F 9/44
[52] U.S. Cl. ........................ 395/700; 364/DIG. 1; 364/280; 364/280.4; 364/280.6; 364/242.94
[58] Field of Search ................ 395/700, 650

[56] References Cited

U.S. PATENT DOCUMENTS

| | | | |
|---|---|---|---|
| 4,809,170 | 2/1989 | Leblony et al. | 364/200 |
| 4,853,872 | 8/1989 | Shimoi | 395/700 |
| 4,885,684 | 12/1989 | Austin et al. | 395/700 |
| 4,901,231 | 2/1990 | Bishop et al. | 395/700 |
| 4,949,254 | 8/1990 | Shorter | 395/700 |
| 4,951,192 | 8/1990 | Chase, Jr. et al. | 395/700 |

FOREIGN PATENT DOCUMENTS 63-271564 of 1968 Japan .
1-196639 of 1989 Japan .

Primary Examiner—Kevin A. Kriess
Attorney, Agent, or Firm—Wolf, Greenfield & Sacks

[57] ABSTRACT

To eliminate the duplication of the same type of compilers, promote the effective use of a disk memory, and save user time and labor using a server machine under distributed environment where a plurality of different types of computers are interconnected by a network, a compiler-installed machine table showing the relationship between compilers for each type of machine and each language and machines holding the compilers, and a library-installed machine table showing the relationship between libraries for each type of machine and machines holding the libraries are provided in a server machine which operates on a specific machine. When the server machine receives a compile request from a client machine which operates on a machine under the above-mentioned environment, the machine searches for machines holding a compiler and libraries required for compilation requested by the client machine using these two tables, and transmits information on the machines to the client machine. The client machine transfers a source program and library-installed machine information received from the server machine to the compiler-installed machine. The compiler-installed machine which receives the program and data collects necessary libraries from the machine holding the libraries by scanning the library-installed machine information to compile the source program and link the libraries. Then, the machine transfers a resultant object file to the client machine.

12 Claims, 11 Drawing Sheets

| | | |
|---|---|---|
| C | ME | maria | ~101
| C | SUN | annie | ~102
| FORTRAN | ME | haleiwA, maria | ~103
| FORTRAN | SUN | annie | ~104
| FORTRAN | next | pip | ~105

| | | |
|---|---|---|
| SUN | libc.a<br>libg.a<br>libsim.a<br>⋮ | annie<br>annie<br>annie<br>⋮ | ~208
| ME | libF77.a<br>libx.a<br>liby.a<br>⋮ | maria<br>haleiwA<br>maria<br>⋮ | ~209
| next | ⋮ | pip<br>⋮ | ~210

FIG. 4

%   CC      sample. C      ME
    |          |            |
    401       402          403

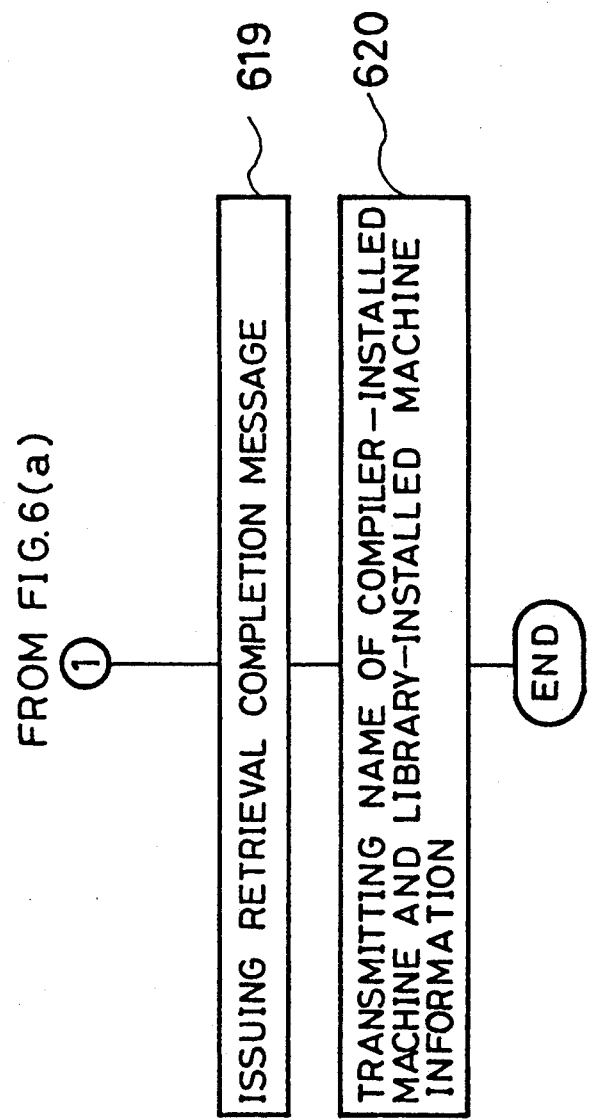

COMPILING SYSTEM FOR DISTRUBUTED COMPUTER SYSTEM WITH MULTIPLE TYPES OF COMPUTERS

BACKGROUND OF THE INVENTION

1. Field of the Invention

The present invention relates to a compiling system under distributed environment where a plurality of different types of computers are interconnected by a network.

2. Description of the Prior Art

FIG. 10 is a flow chart of a source program from translation to execution. The source program 101 is compiled by a compiler 103 after being processed by a pre-processing system 102. The output of the compiler 103 is an assembler language program, machine language codes which can be almost directly executed, or machine language codes containing information which can be located on any area of a memory device. When the output of the compiler 103 is an assembler language program, an assembler 104 receives the program and converts it into relocatable codes. A linkage editor 105 collects some of the relocatable codes from a library 106 to link them, and replaces code references for separately compiled programs with addresses when the programs are loaded on the memory device. The above processes are generally performed on a single machine, and an object code 107 is obtained.

Such processes, for example, appear on "1.3 Compiler and Programming Environment" (pp. 10 to 11) of "Iwanami Koza Software Chemistry—5, Programming Language Processing System".

FIG. 9 is a schematic diagram of the configuration of a computer network. Since the computer network is configured in such a way that system resources (such as hardware, software and databases) are interconnected so that they can be shared, and a plurality of computers having independent functions are connected to the network so that the exchange and shared use of information among the computers are possible, the system resources can be shared by the computers, the hardware and software functions of other computers can be used, or databases managed by other computers can be accessed. In FIG. 9, the network consists of computers 1 to 3 and terminals 4 to 11.

Such a computer network, for example, is described in "1-2-1-1 Distributed Processing System of Computer Network" (pp. 1019 to 1120) of the Illustrated Computer Encyclopaedia published by Ohm.

The operation of this computer network will be described hereafter.

A conventional compiling system compiles a source file prepared by a user's machine holding a library and a compiler of its own. However, this results in the existence of a plurality of compilers of the same type over the network, not making the most of the advantage a computer network can have in sharing and exchanging information. Take the example where the computers 1 and 2 are of the same type, the computer 3 is of a different type, the computer 1 does not have a compiler, and the computers 2 and 3 have each a compiler and a library of their own. In this case, the compiling system over the network when a user prepares a source file on the computer 1 is one in which the source file is transferred to the computer 2 for compilation and linkage on the computer 2, and a resultant object file is transferred to the computer 1. In this compiling system, the user needs to operate all transfers deliberately, resulting in a burden on the user. In another example, the computer 1 and 2 are of the same type, the computer 3 is of a different type, and the computer 2 has a cross compiler of the computer 3. In this case, the compiling system when a user prepares on the computer 2 a file to be executed on the computer 3 is one in which a source file prepared on the computer 2 is cross-compiled on the computer 2 and a resultant object file is transferred to the computer 3. However, in this system, the user must perform the transfer himself, also resulting in a burden on the user.

In such conventional systems, computers of the same type each have the same compiler and related libraries, and the disk memory of the machine is occupied by the compiler and the libraries under distributed environment. In addition, a user needs to purchase software to install the compiler and the libraries, and also needs to perform many data input/output operations to compile a source file on another machine, thus taking extra time and labor.

Another conventional compiling system is one in which a source file is compiled by a single large computer with a variety of microprocessor software using a time sharing system (TSS). The problems seen in a compiling system using TSS are the heavy load falling on a host computer and the inability to use microprocessor software other than that offered by the system, resulting in lack of extendibility.

SUMMARY OF THE INVENTION

The present invention has been worked out to solve the above problems, and it is therefore an object of the present invention to provide a compiling system under distributed environment which can eliminate the duplication of the same type of compilers, enable a user to obtain an object file without being aware that a compiler is absent in the machine he uses, and provide the extendibility of software use.

The compiling system according to the present invention is characterized in that:

a server (a server machine 301), which comprises a compiler-installed machine table 304 showing the relationship between compilers for each type of machine and each language, and machines holding the compilers, and a library-installed machine table 305 showing the relationship between libraries for each type of machine and machines holding the libraries, and operates on a specific machine under the above-mentioned environment, searches for machines holding a compiler and libraries required for compilation requested by a client (a client machine 302) which operates on a specific machine under the above-mentioned environment using the above-mentioned compiler-installed machine table 304 and the library-installed machine table 305, when it receives a compile request from the client, and transmits information on the searched machines to the client;

the client transfers a source program and library-installed machine information obtained from the server to the compiler-installed machine (a compiler-installed machine 303); and the compiler-installed machine which receives the library-installed machine information identifies the machine holding necessary libraries from the library-installed machine information, collects the libraries from this machine for compilation and linkage, and transfers an obtained object file to the client.

In other words, in the compiling system according to the present invention, when information on type of machine and type of language is provided from the client (client machine 302) to the server (server machine 301), the server searches for machines holding a necessary compiler and necessary libraries from the tables 304 and 305, and transfers the name of the compiler-installed machine and information on machines holding libraries written in the language to the client. The client which has received these data transfers the source program and the library-installed machine information to the compiler-installed machine (compiler-installed machine 303) to request the compilation of the source program. The machine requested to compile the source program collects the necessary libraries from the library-installed machine by scanning the transmitted library-installed machine information to compile the source program and link the libraries. Then, the machine transfers a resultant object file to the client. This system can eliminate the duplication of the same type of compilers under distributed environment, and enables a user to obtain an object file without being aware of the compiler-installed machine.

The above and other objects, features and advantages of the invention will become more apparent from the following description when taken in conjunction with the accompanying drawings.

BRIEF DESCRIPTION OF THE DRAWINGS

FIG. 1 is a diagram of a compiler-installed machine table held by the server machine according to an embodiment of the present invention;

FIG. 2 is a diagram of a library-installed machine table held by the server machine according to the embodiment;

FIG. 4 is a diagram illustrating an example of a command inputted into the client machine in this embodiment;

FIGS. 6(a) and 6(b) form a flow chart illustrating the processing steps of the server machine in this embodiment;

DESCRIPTION OF THE PREFERRED EMBODIMENT

Figure 3:
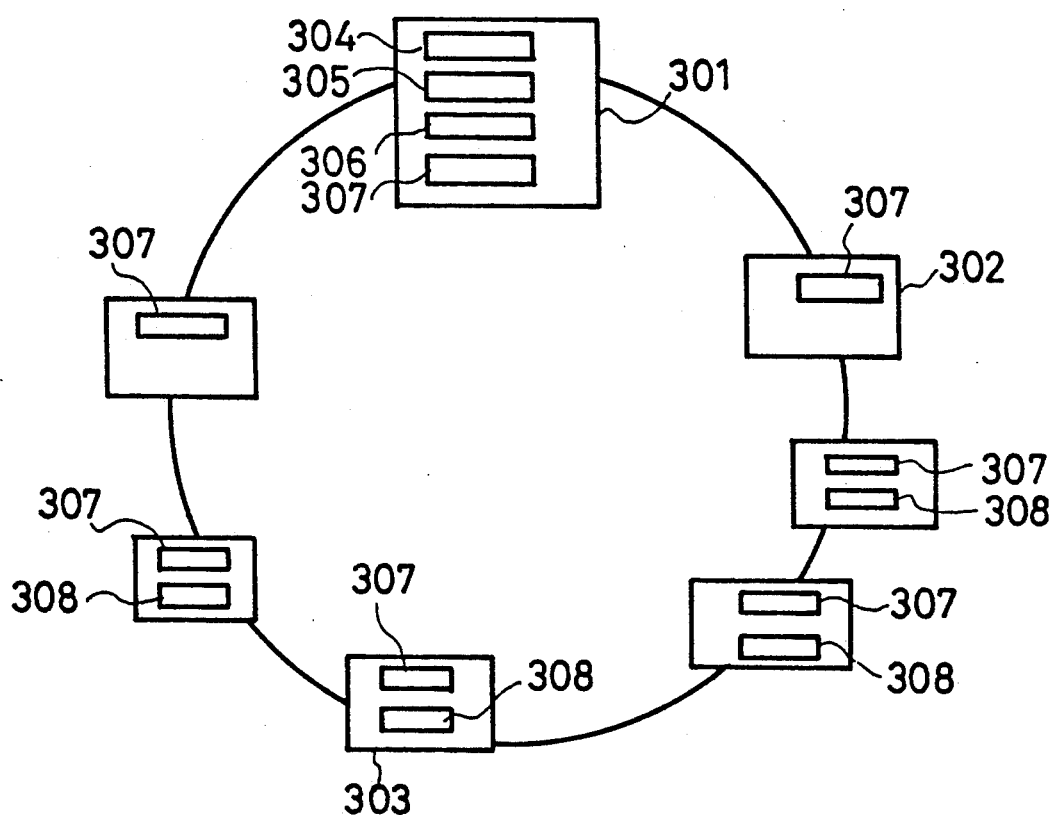
FIG. 3 is a diagram of the configuration of a network under distributed environment according to the embodiment.

FIG. 1 is a diagram of a compiler-installed machine table used in the compiling system according to an embodiment of the present invention. This compiler-installed machine table 304 shows the relationship between compilers for each type of machine and each language, and machines holding the compilers. In the figure, the names of languages are provided in the left column, the names of machine types in the center column, and the names of machines holding compilers for the type of machine of the left column and the language of the center column, in the right column. In the figure, reference numerals 101 to 105 represent the names of machines holding compilers.

FIG. 2 is a diagram of a library-installed machine table used in the compiling system. This library-installed machine table 305 shows the relationship between libraries for each type of machine and machines holding the libraries. In the figure, the names of machine types are provided in the left column, the names of the libraries in the center column and the names of machines holding the libraries of the center column, in the right column. In the figure, reference numerals 208 to 210 represent library-installed machine information.

FIG. 3 is a diagram of the configuration of distributed environment according to this embodiment. In the figure, reference numeral 301 represents a server machine (server) for performing retrieval processing described hereafter, 302 a client machine (client) requesting compilation, and 303 a machine holding a compiler. The server machine 301 comprises the compiler-installed machine table 304, the library-installed machine table 305, and a server program 306. All machines under distributed environment hold a client program 307, but the compiler-installed machine 303 has a compiling program 308 in addition to the client program. The compiler-installed machine table 304 and the library-installed machine table 305 are prepared by the use of a text editor, for example, of the server machine 301.

Figure 4:
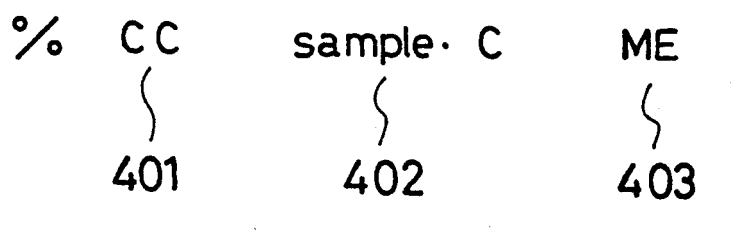

FIG. 4 is a diagram of an example of a command inputted into the client machine in this embodiment. In the figure, reference numeral 401 represents a normal compile command, 402 the name of a source file (the name of a source program), and 403 the name of a machine type for compiling the source file.

Figure 5A:
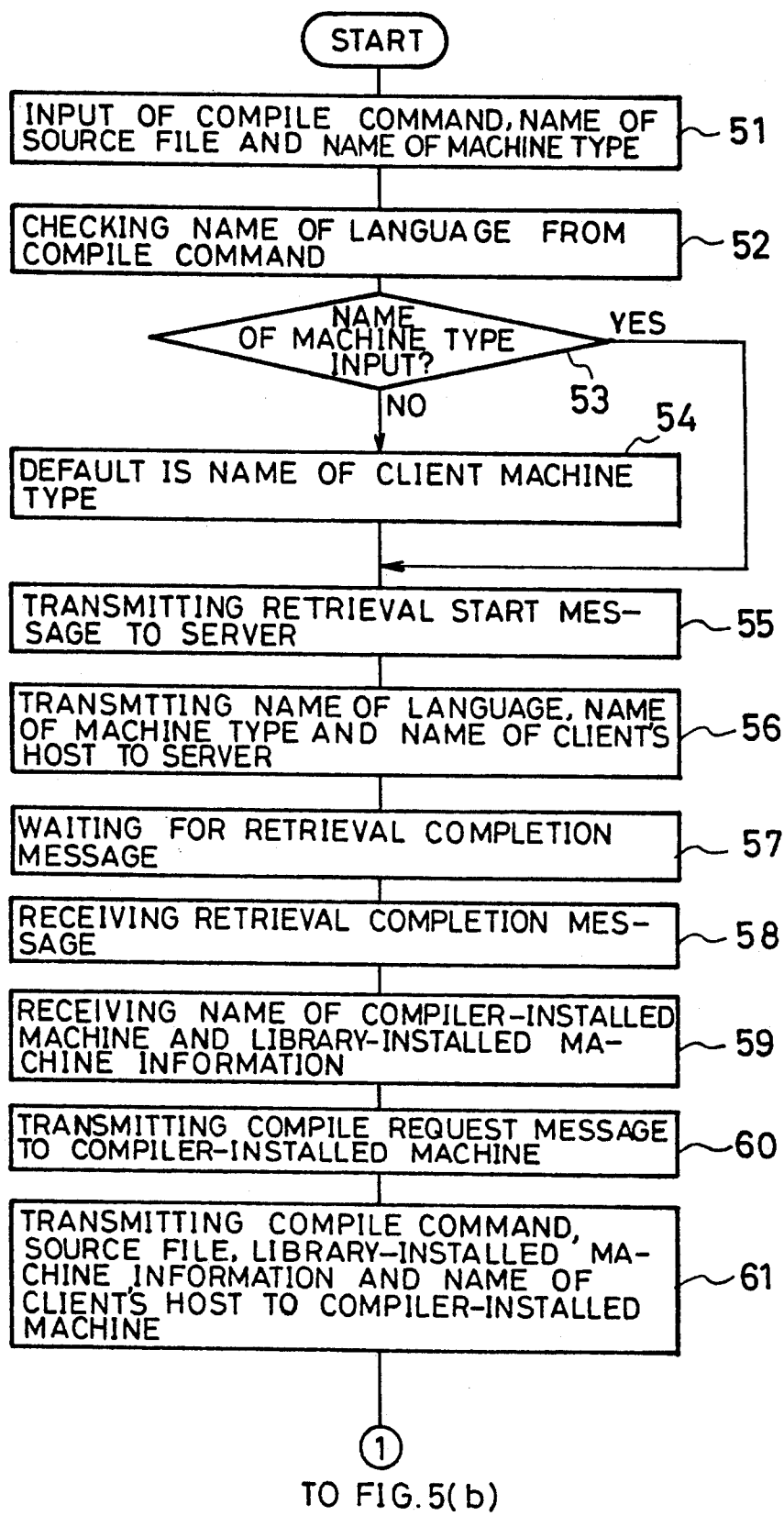
FIGS. 5(a) and 5(b) form a flow chart illustrating the processing steps of the client machine in this embodiment.
Figure 5B:
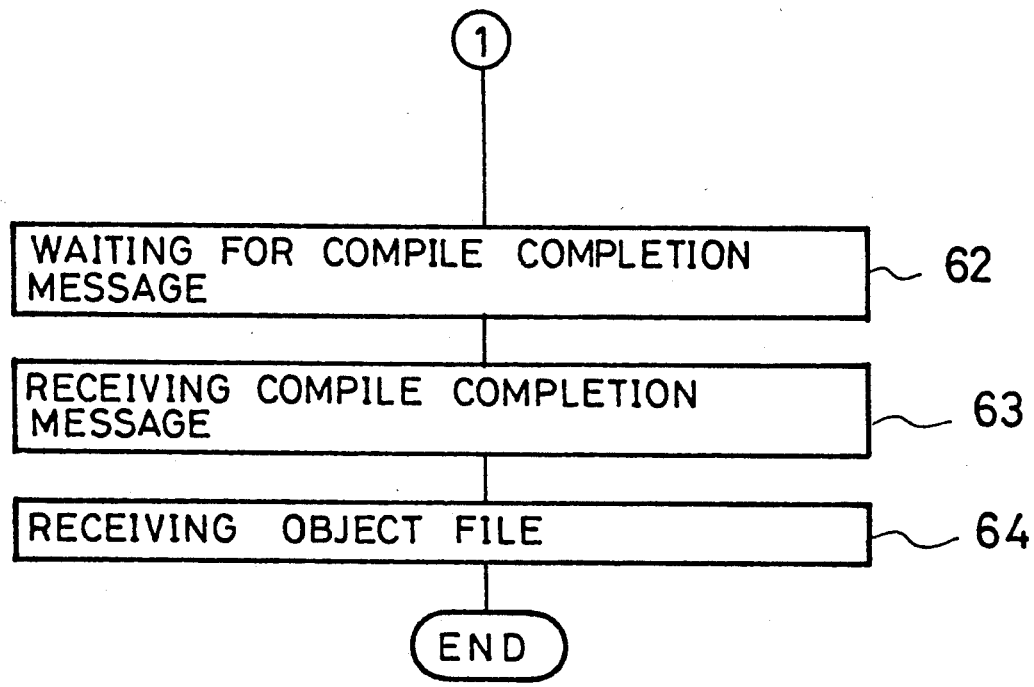

FIG. 5 is a flow chart illustrating the processing steps of the above-mentioned client machine. When a compile command, the name of a source file and the name of a machine type are inputted into the client machine (step 51), the client machine checks the name of a language from the compile command (step 52). When the name of the machine type is inputted (step 53), the client machine transmits a retrieval start message to the server machine 301 (step 55). When the name of the machine type is not inputted (step 53), the default is the type name of the client machine 302 (step 54). After step 55, the client machine transmits the name of the language, the name of the machine type and the host name of the client machine 302 to the server machine 301 (step 56). The client machine waits for a retrieval completion message (step 57). The client machine receives the retrieval completion message (step 58), the name of the compiler-installed machine and the library-installed machine information (step 59). Thereafter, the client machine transmits a compile request message to the compiler-installed machine 303 (step 60). In addition, the machine transmits the compile command, the source file, the library-installed machine information and the host name of the client machine 302 to the compiler-installed machine 303 (step 61). Then the machine waits for a compile completion message (step 62), and receives the compile completion message (step 63) and an object file (step 64).

Figure 6A:
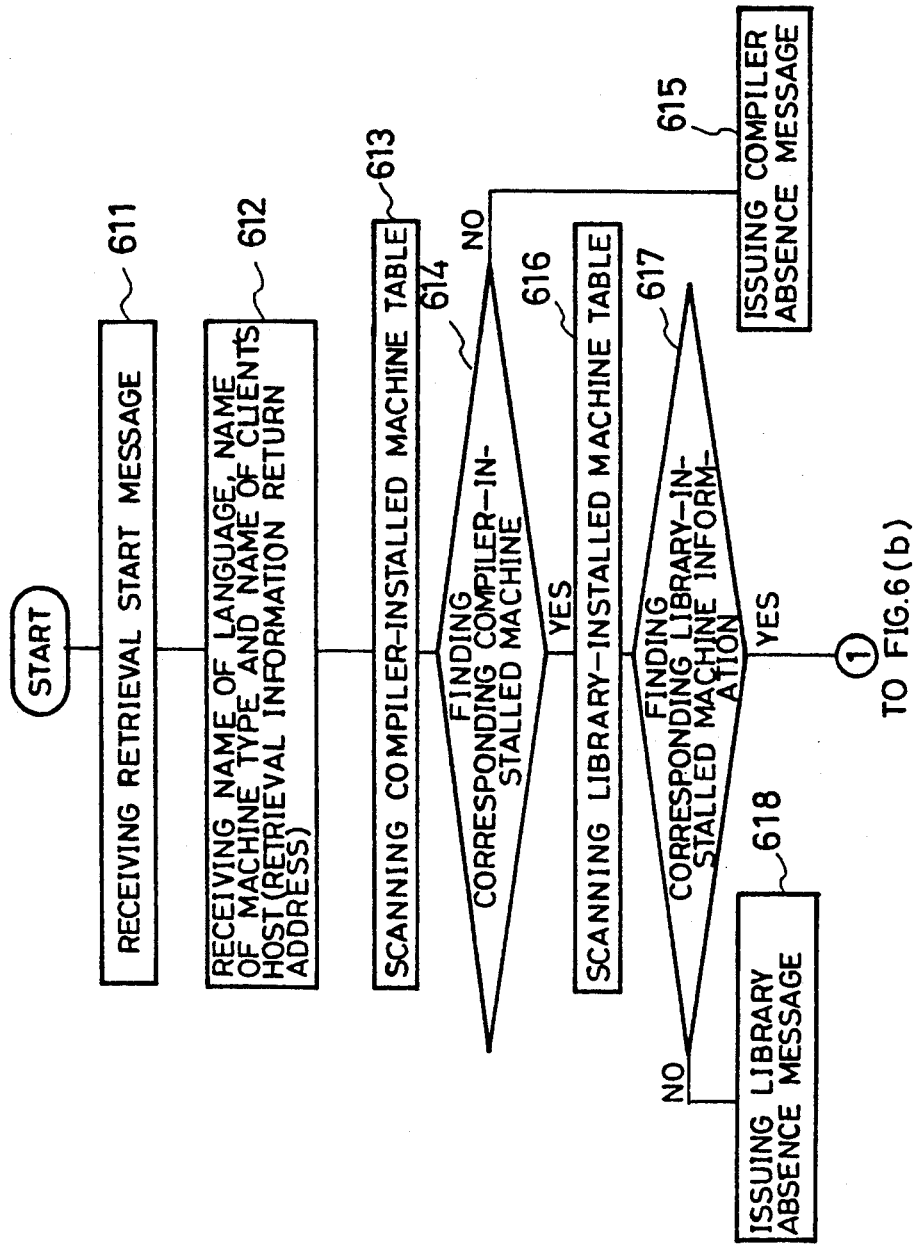

FIG. 6 is a flow chart illustrating the processing steps of the aforementioned server machine. The server machine first receives a retrieval start message (step 611) and then the name of the language, the name of the machine type, and the host name of the client machine 302 (retrieval information return address) (step 612). Then, the server machine scans the compiler-installed machine table 304 (step 613). When the machine cannot find the compiler-installed machine specified by the transmitted information (step 614), it issues a compiler absence message (step 615). When the machine finds the compiler-installed machine (step 614), it scans the library-installed machine table 305 (step 616). When the machine cannot find the library-installed machine information specified by the transmitted information (step 617), it issues a library absence message (step 618). When it finds the library-installed machine information (step 617), it issues a retrieval completion message (step 619), and transmits the name of the compiler-installed machine and the library-installed machine information to the client machine 302 (step 620).

Figure 7:
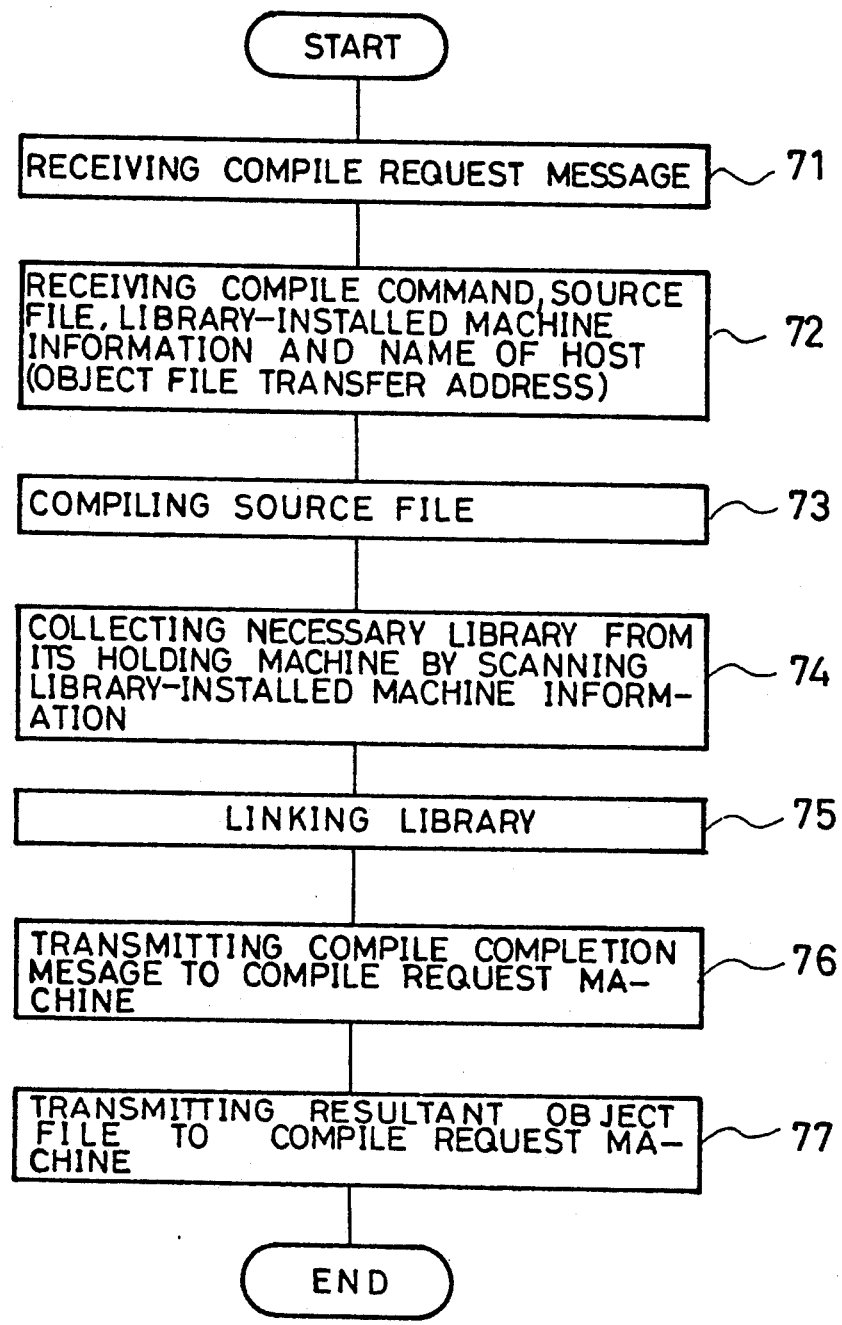
FIG. 7 is a flow chart illustrating the processing steps of the compiler-installed machine in this embodiment.

FIG. 7 is a flow chart illustrating the processing steps of the above-mentioned compiler-installed machine. The machine first receives the compile request message (step 71), and then the compile command, the source file, the library-installed machine information and the host name of the client machine 302 (object file transfer address) (step 72). Thereafter, the machine compiles the source file (step 73), and scans the library-installed machine information to collect necessary libraries from the machine holding the libraries (step 74). The machine links the libraries (step 75) and transmits a compile completion message to the compile request machine (step 76), and then a resultant object file to the compile request machine (step 77).

Figure 8:
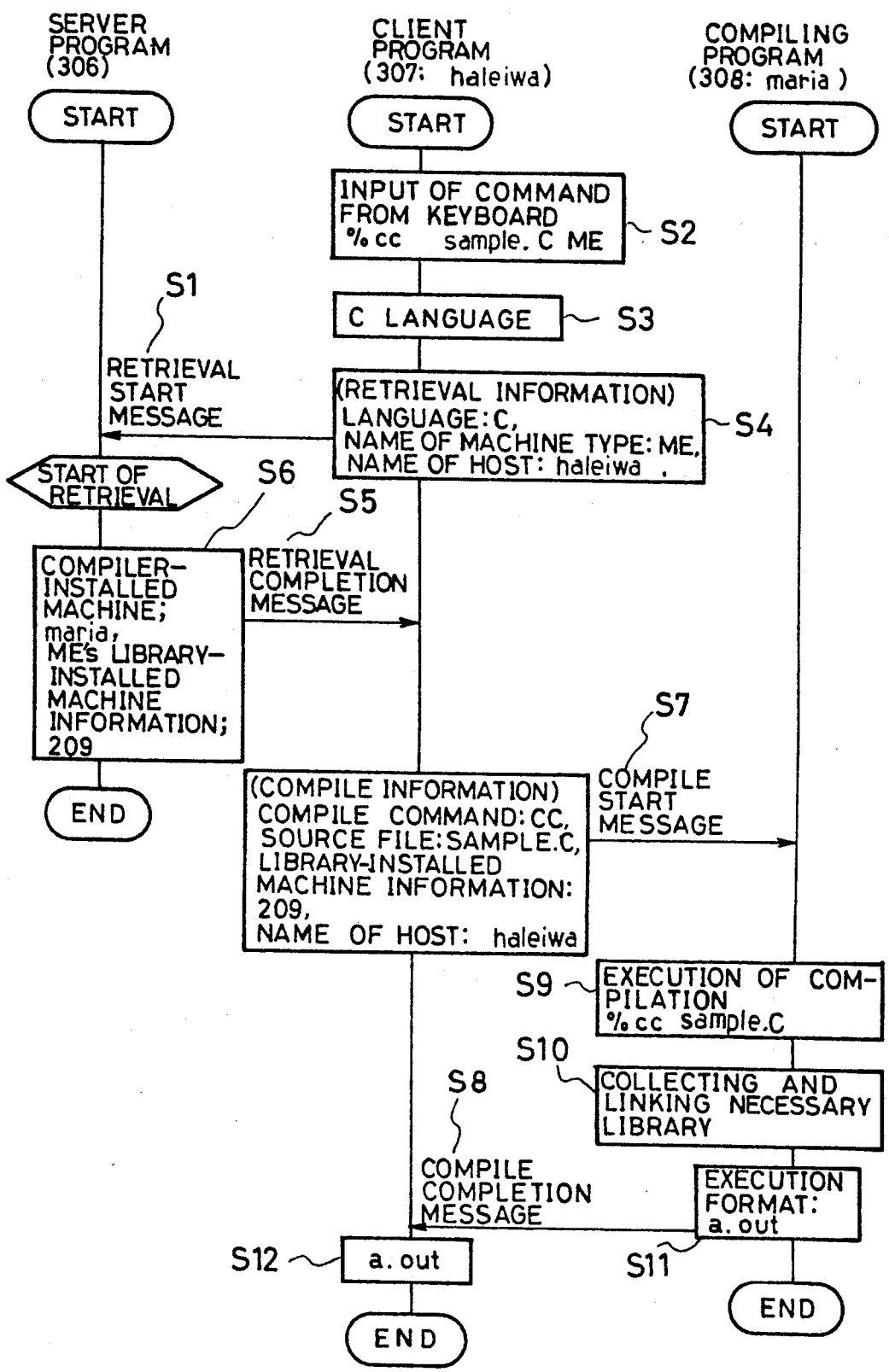
FIG. 8 is a flow chart illustrating the processing steps of compilation under distributed environment in this embodiment.
Figure 9:
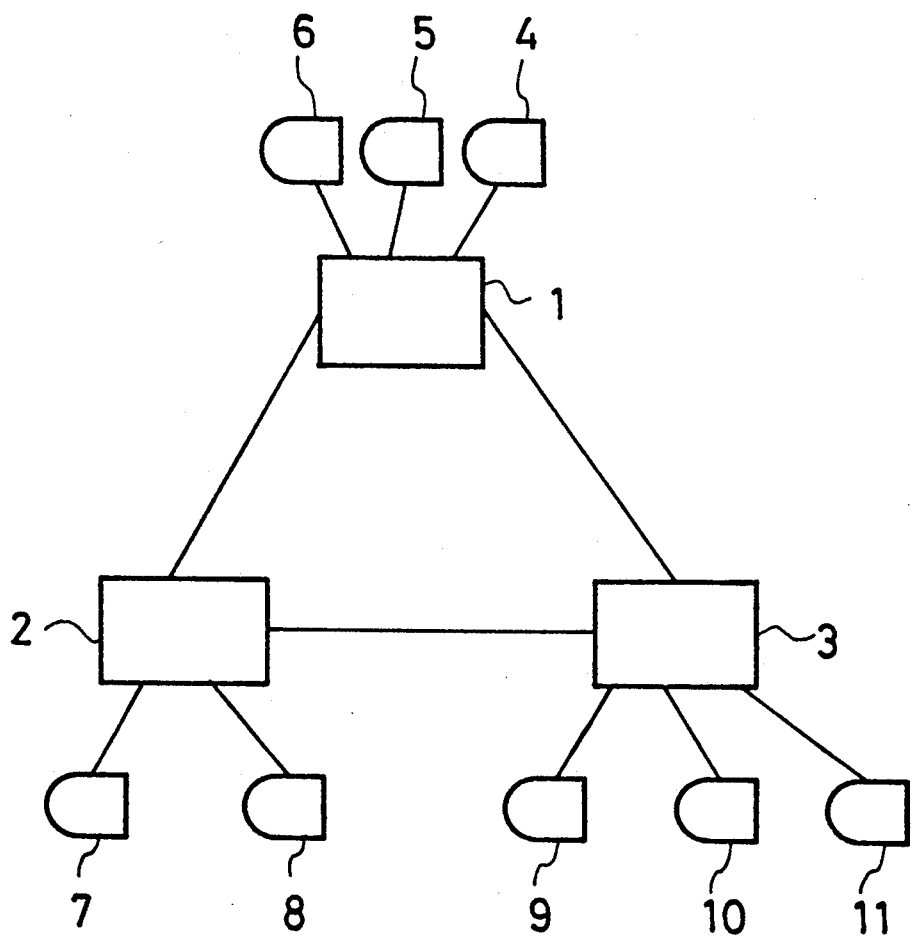
FIG. 9 is a diagram of the configuration of a conventional computer network.
Figure 10:
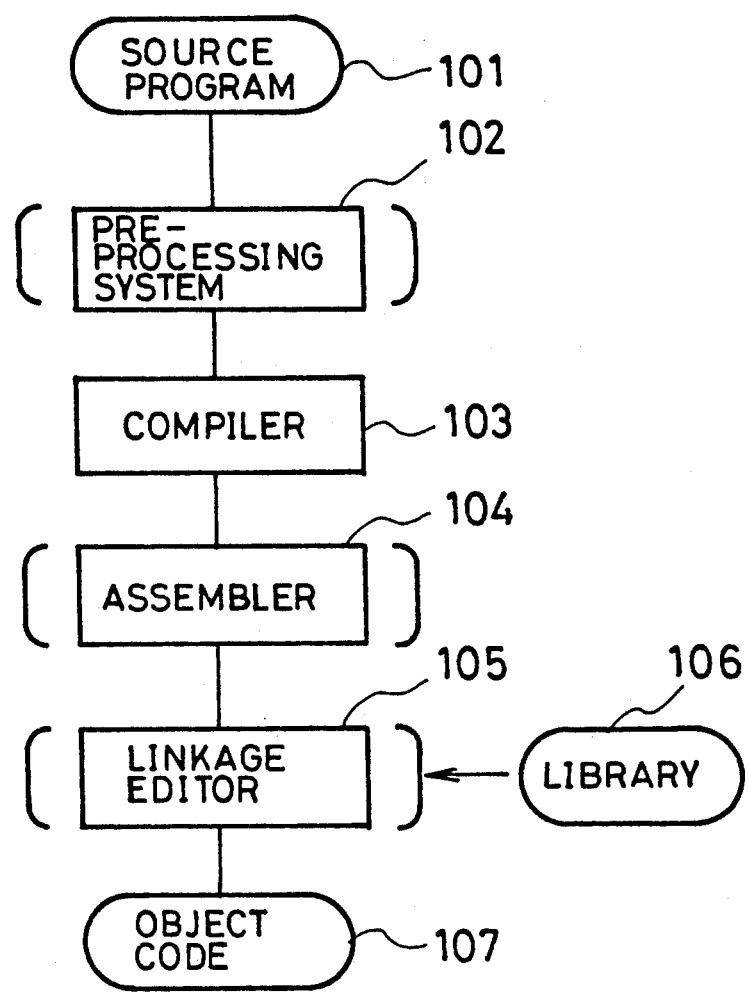
FIG. 10 is a flow chart of a source program from translation to execution.

FIG. 8 is a flow chart of an example of compilation under distributed environment. First, the server program 306 of the server machine 301 waits for the retrieval start message from the client machine 302 (step S1). The client machine 302 inputs the normal compile command 401, the name of the source file 402, and the name of the machine type for compiling the source file 403 from the keyboard (step S2), When the name of a machine type for compiling a source file is not specified, the default is the type name of the client machine 302 according to the client program 307. The client program 307 processes the compile command 401, and identifies the name of the language (C in case of the name of the source file 402) (step S3). Thereafter, the client program 307 transmits the retrieval start message, the name of the language (C in case of the compile command 401), the name of the machine type 403 and the name of the host to the server program 306 (step S4) and waits for the retrieval completion message from the server program 306 (step S5).

The server program 306 of the server machine 301 receives the retrieval start message from the client program 307 of the client machine 302 and then the name of the language (C) and the name of the machine type 403 (ME), and scans the compiler-installed machine table 304 to identify the name of the compiler-installed machine 101, and the library-installed machine table 305 to obtain the library-installed machine information 209 (step S6). Then the program transmits these data to the client program 307 together with the retrieval completion message. If there is no machine specified by these data, the program transmits a compiler absence message or a library absence message to the client program 307 and waits again for a retrieval start message.

The client program 307 of the client machine 302 receives the name of the compiler-installed machine 101 and the library-installed machine information 209 together with the retrieval completion message from the server program 306, and identifies the name of the compiler-installed machine 101 from the received information. Then the machine transmits the compile command 401, the source file 402, the library-installed machine information 209 received from the server program 306, and the name of the host to the machine together with the compile start message (step S7). The program waits for the compile completion message to be transmitted from the compiling program 308 of the compiler-installed machine 303 (step S8).

The compiling program 308 of the compiler-installed machine 303 first receives the compile start message, and then the compile command 401, the source file 402, the library-installed machine information 209 and the name of the host from the client program 307. The program compiles the transmitted source file 402 according to the transmitted compile command 401 (step S9). The program scans the transmitted library-installed machine information 209 and collects the necessary libraries from the machine holding the libraries to link (step S10). Thereafter, the program transmits the resultant object file to the client program 307 together with the compile completion message (step S11). The client program 307 of the client machine 302 receives the object file together with the compile completion message (step S12).

The processing steps of the above-mentioned embodiment can be summarized as follows.

(1) Under distributed environment, a compiler-installed machine table and a library-installed machine table are provided in a server machine and stored in files.

(2) A server program begins to run in the server machine and waits for a retrieval start message from a client program.

(3) When a user inputs a command (an ordinary compile command, the name of a source file, the name of a specified machine type) to start compilation from a terminal, the name of a specified machine type, the name of a language and the name of the host of a client machine are transmitted as retrieval information to the server program together with the retrieval start message, upon which a retrieval completion message from the server program is awaited.

(4) The server program which receives the retrieval start message becomes ready to accept retrieval and receives the name of a specified machine type, the name of a language and the name of the host machine of the client machine as retrieval information. After the reception of these data, the server program searches for the type of a specified machine, the name of a machine holding a compiler for a specified language and the library-installed machine information for the specified machine type, and transmits these data to the client program together with a retrieval completion message.

(5) The client program which receives the retrieval completion message identifies the compiler-installed machine from the transmitted information, transmits a compile request message, a source file, the library-installed machine information transmitted from the server program, and the name of the host of the client machine to the machine and waits for a compile completion message.

(6) The compiler-installed machine which receives the compile request message scans the transmitted library-installed machine information to collect necessary libraries from the machine holding the libraries. The machine compiles the source file and links the libraries, and transmits a resultant object file to the client program together with a compile completion message.

(7) The client program receives the object file together with the compile completion message.

As described above, according to the present invention, a compiler-installed machine table and a library-installed machine table are provided in a server which operates on a specific machine under distributed environment. The server searches for machines holding a compiler and libraries required for compilation requested by a client using these tables, and transmits information on the machines to the client which in turn transfers a source file and library-installed machine information obtained from the server to the compiler-installed machine. The compiler-installed machine, which receives the library-installed machine information, identifies the machines holding necessary libraries from the library-installed machine information, collects the libraries from the machine to compile the source file and link the libraries, and transfers a resultant object file to the client. Therefore, the duplication of the same type of compilers under distributed environment can be eliminated, resulting in the effective use of a memory resource and cost reduction. In addition, if a user's machine does not have a compiler, a user can obtain an object file without being aware that the compiler is absent, whereby operation can be automated, operation efficiency can be improved, and the use of software can be extended.

What is claimed is:

1. A compiling system under a distributed environment where a plurality of different types of computers are interconnected by a network, comprising:
   a client computer having means for requesting compilation of a source file, said compilation requiring a necessary compiler and a necessary library;
   a server computer having
   (i) an internal memory in which a compiler-installed computer table is prestored as a data table and which shows a relationship between a compiler for each type of computer and each language and a computer holding the compiler and a library-installed computer table which shows a relationship between a library for each type of computer and a computer holding the library, and
   (ii) means, operative in response to a request from the client, for identifying a computer on the network holding the necessary compiler and a computer on the network holding the necessary library by searching said compiler-installed computer table and said library-installed computer table, and means for transferring information indicative of a name of the computer on the network holding the necessary compiler and a name of the computer on the network holding the necessary library to the client computer;
   said client computer having means for transferring a source file and information indicative of a name of the computer on the network holding the necessary library to the identified computer on the network holding the necessary compiler; and
   the identified computer holding the necessary compiler having means for collecting the necessary library from the computer holding the necessary library and means for compiling the source file and for linking the necessary library to obtain a resultant object file, and means for transferring the resultant object file to the client computer.

2. The compiling system under a distributed environment according to claim 1, wherein
   the server computer further has a server program stored in the memory and defining predetermined processing steps and a processor for performing the predetermined processing steps.

3. The compiling system under distributed environment according to claim 1, wherein
   the client computer further has a client program stored in a memory and defining predetermined processing steps and a processor for performing the predetermined processing steps.

4. The compiling system under distributed environment according to claim 1, wherein
   said compiler-installed computer table and said library-installed computer table are prepared by the use of a text editor of the server computer.

5. The compiling system under distributed environment according to claim 1, wherein
   said compiler-installed computer table and said library-installed computer table are stored as a computer file.

6. A compiling system under a distributed environment where a plurality of different types of computers are interconnected by a network, said plurality of computers forming the network including a client computer and a specific server computer, comprising:
   said client computer having:
   (i) means for receiving a compile command, a type name of a compile request computer on the network requesting compilation of a source file and a name of source file to be compiled,
   (ii) means for determining a name of language from the received compile command, and
   (iii) means for transferring the name of said compile request computer and the name of language to the server computer and for outputting a command for retrieving whether there are any computers on the network holding a compiler for said source file and holding a necessary library, to the server computer;
   said server computer having an internal memory in which a compiler-installed computer table is prestored as a data table and which shows the relationship between a compiler for each type of computer and each language and a computer on the network holding the compiler, and in which a library-installed computer table is prestored as a data table and which shows the relationship between a library for each type of computer and a computer on the network holding the library, and
   retrieval means, operative in response to said command from the client computer, for firstly identifying a compiler-installed computer for compiling said source file on the network by retrieving said compiler-installed computer table and for secondly identifying a library-installed computer holding the necessary library on the network by retrieving the library-installed computer table, so that the information on the name of the compiler-installed computer and the library-installed computer can be obtained, and means for transferring said information on the name of the compiler installed computer and the name of the library-installed computer to said client computer;

said client computer having means for transferring the information on the name of the compiler-installed computer, the name of the library-installed computer and the source file which were transferred from said server computer, to said compiler-installed computer; and said compiler-installed computer having means for compiling the source file by the holding compiler and for collecting the necessary library from the appropriate library-installed computer based on the information on the name of the library-installed computer transferred from the client computer, means for linking such a collected library to produce an object file, and means for transferring the object file to the client computer.

7. The compiling system according to claim 6, wherein said client computer further has means for deciding whether the type name of the compile-request computer and means for transferring the type name of the compile-request computer when the type name is received or the type name of the client computer when not received to the server computer.

8. The compiling system according to claim 6, wherein said retrieval means for the server computer retrieves the compiler-installed computer table and the library-installed computer table to identify whether the compiler-installed computer and the library-installed computer are on the network and sends an absent signal to said client computer when either of the compiler-installed computer and the library-installed computer are not on the network.

9. The compiling system according to claim 6, wherein the compiler-installed computer table is provided with a column for a computer type name, a column for a language name and a column for a computer name on the network, respectively and the computer name is retrieved based on the computer type name and the language name.

10. The compiling system according to claim 6, wherein the library-installed computer table is provided with a column for a computer type name, a column for a library name and a column for a computer name on the network, respectively and the computer name is retrieved based on the computer type name and the library name.

11. The compiling system according to claim 6, wherein said client computer is provided with means for transferring the transferred object file to said compile-request computer.

12. The compiling system according to claim 2, wherein all the computers on the network have client programs and can function as client computer.

* * * * *